R. E. BROWN.
RAIL CLAMP FOR TRAVELING BRIDGES.
APPLICATION FILED AUG. 11, 1915.

1,297,083.

Patented Mar. 11, 1919.
6 SHEETS—SHEET 2.

WITNESSES

INVENTOR

R. E. BROWN.
RAIL CLAMP FOR TRAVELING BRIDGES.
APPLICATION FILED AUG. 11, 1915.

1,297,083.

Patented Mar. 11, 1919.
6 SHEETS—SHEET 3.

WITNESSES

INVENTOR

R. E. BROWN.
RAIL CLAMP FOR TRAVELING BRIDGES.
APPLICATION FILED AUG. 11, 1915.
1,297,083.
Patented Mar. 11, 1919.
6 SHEETS—SHEET 4.
FIG. 4
FIG. 5
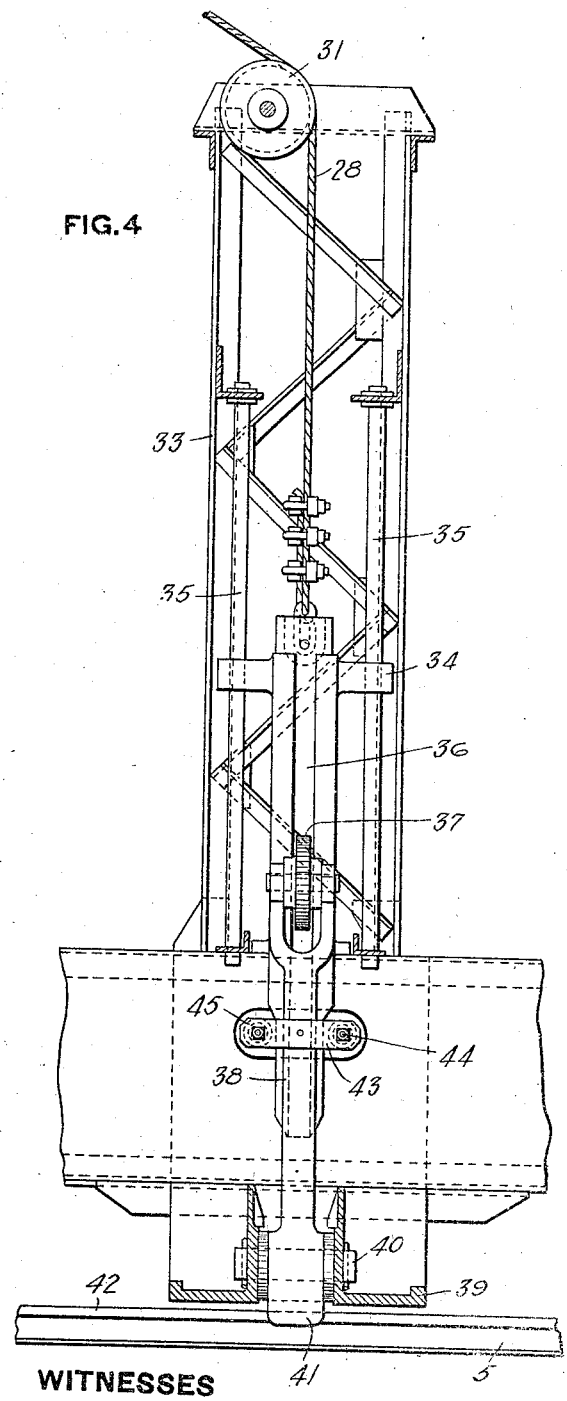
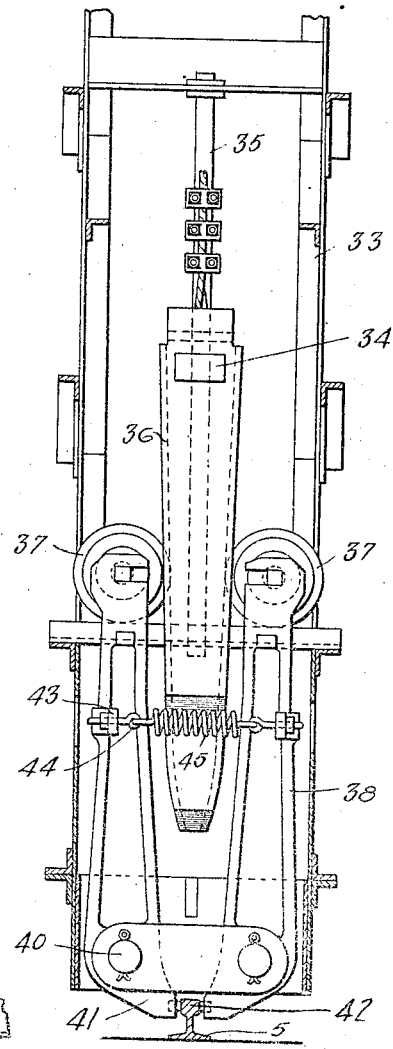
WITNESSES
John F. Hill
J. F. Armstrong
INVENTOR
Raymond E. Browne

R. E. BROWN.
RAIL CLAMP FOR TRAVELING BRIDGES.
APPLICATION FILED AUG. 11, 1915.

1,297,083.

Patented Mar. 11, 1919.
6 SHEETS—SHEET 5.

WITNESSES
John F. Will
S. F. Armstrong

INVENTOR
Raymond E. Brown

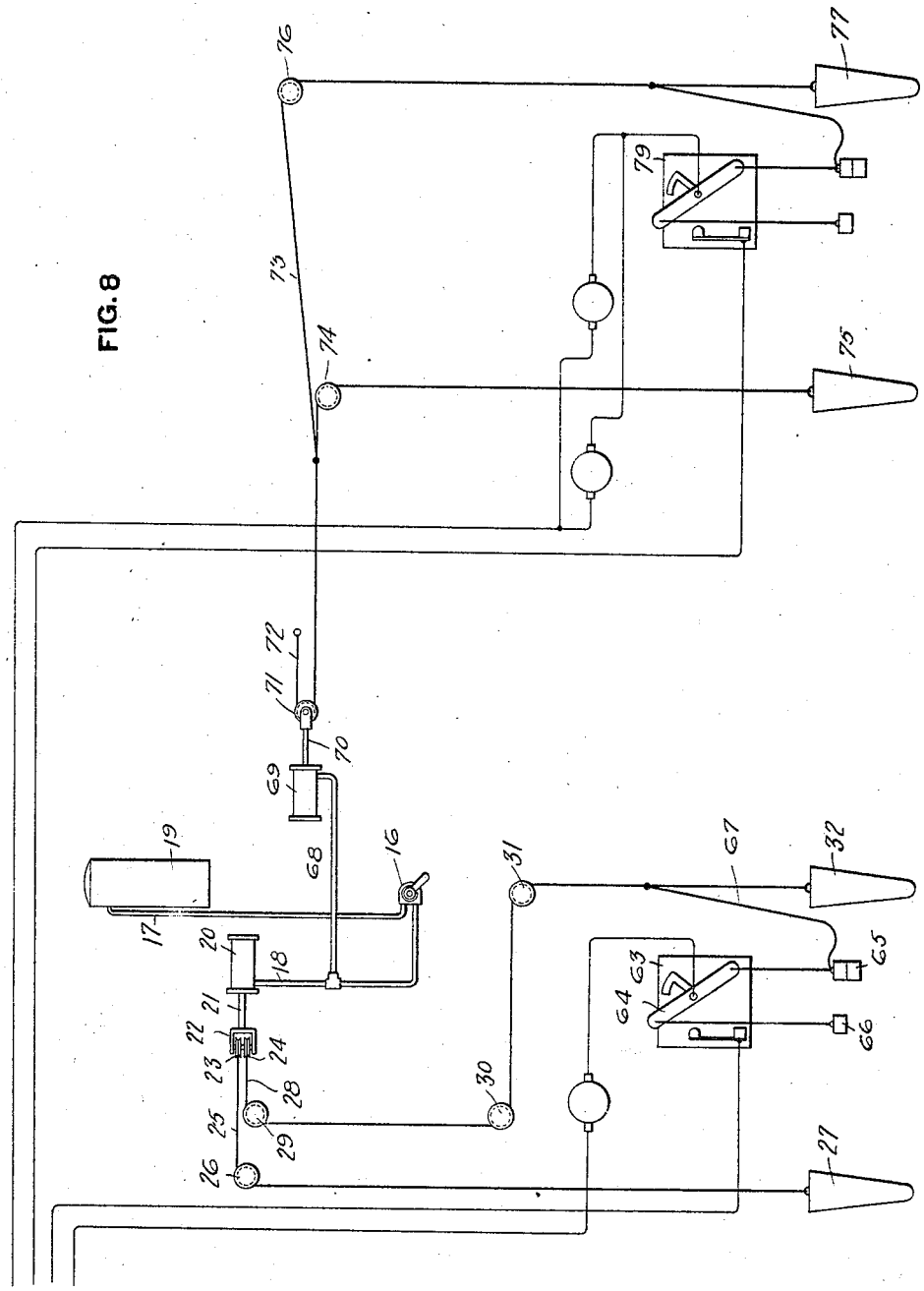

UNITED STATES PATENT OFFICE.

RAYMOND E. BROWN, OF BELLEVUE, PENNSYLVANIA, ASSIGNOR TO HEYL & PATTERSON, INC., OF PITTSBURGH, PENNSYLVANIA, A CORPORATION OF PENNSYLVANIA.

RAIL-CLAMP FOR TRAVELING BRIDGES.

1,297,083. Specification of Letters Patent. Patented Mar. 11, 1919.

Application filed August 11, 1915. Serial No. 45,033.

*To all whom it may concern:*

Be it known that I, RAYMOND E. BROWN, a citizen of the United States, and resident of Bellevue, in the county of Allegheny and State of Pennsylvania, have invented a new and useful Improvement in Rail-Clamps for Traveling Bridges; and I do hereby declare the following to be a full, clear, and exact description thereof.

My invention relates to rail-clamps for traveling bridges.

The object of my invention is to provide a simple and efficient means for holding traveling bridges securely in position when they are brought to a state of rest, and means for quickly disengaging the clamps from the rails.

In my invention I employ suspended wedge-shaped members which are adapted to move between the upper ends of the clamping arms, so as to force the clamps against the rails, and means, if desired, operated by the withdrawal of said weights to permit the motors to be operated for moving the bridge along the track.

Figure 1:
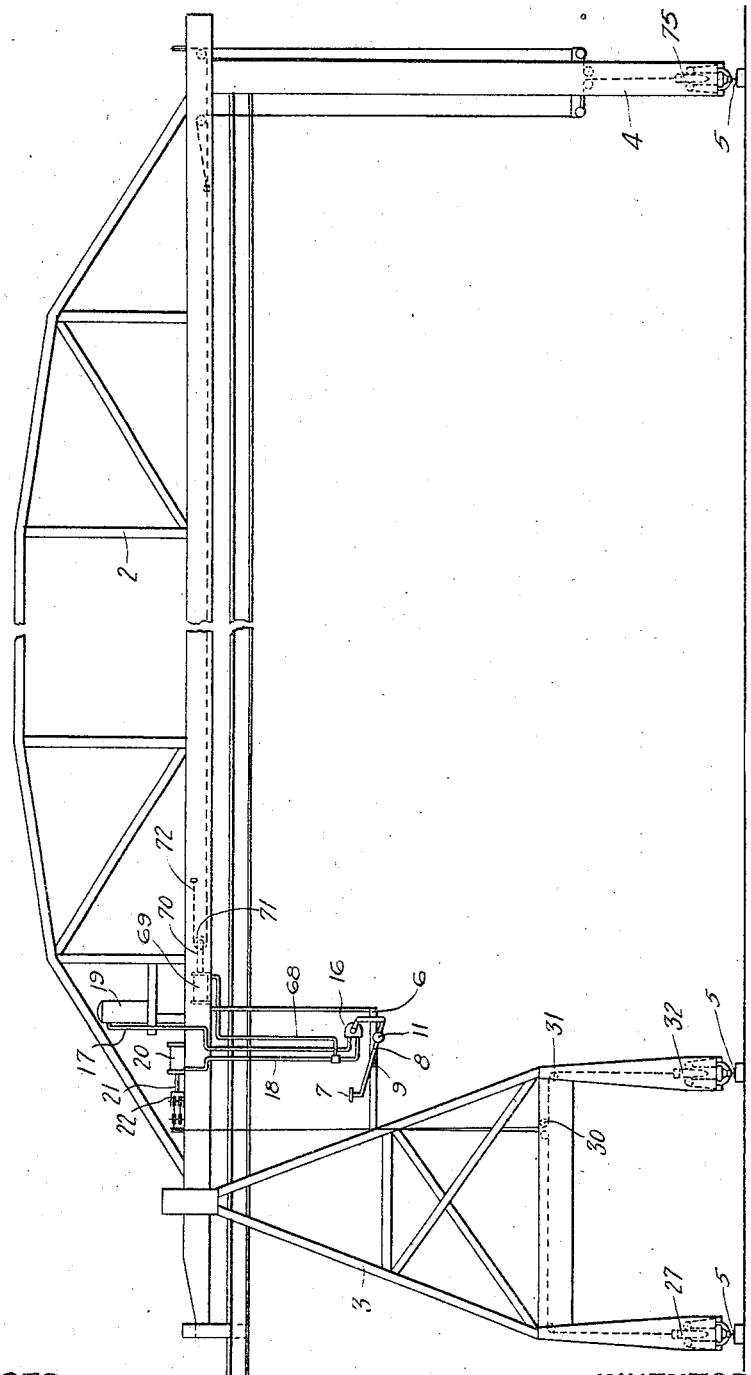
Figure 2:
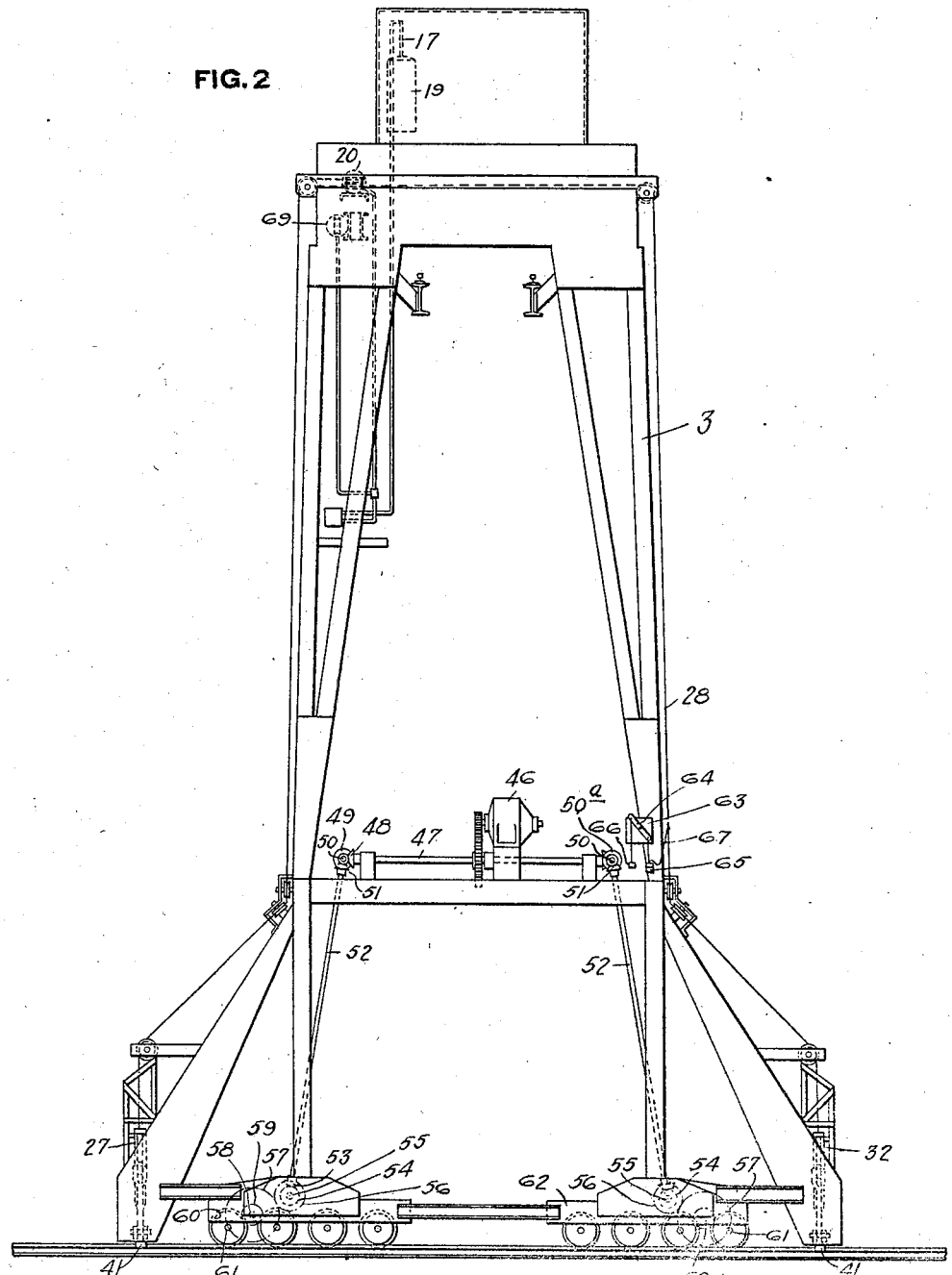
Figure 3:
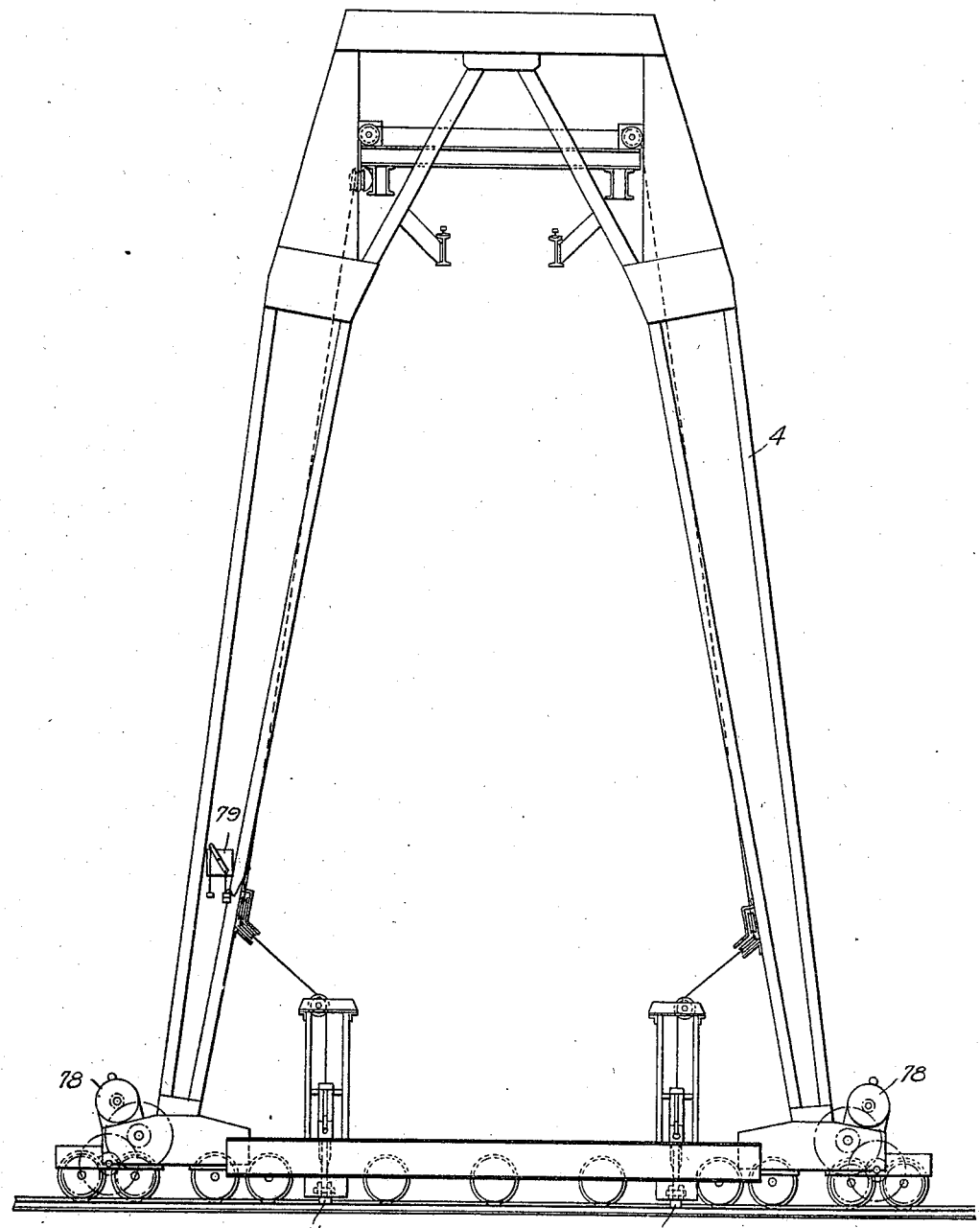
Figure 6:
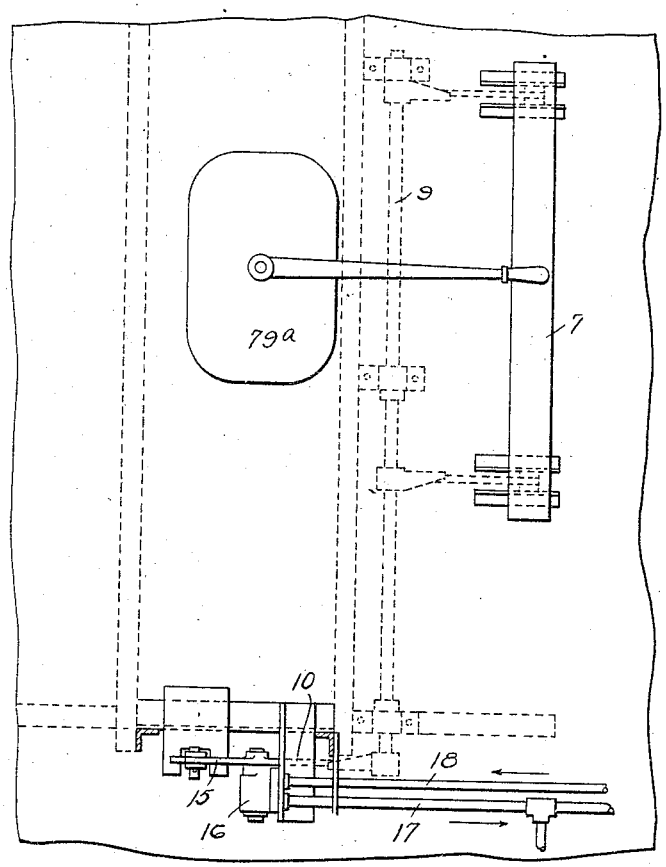
Figure 7:
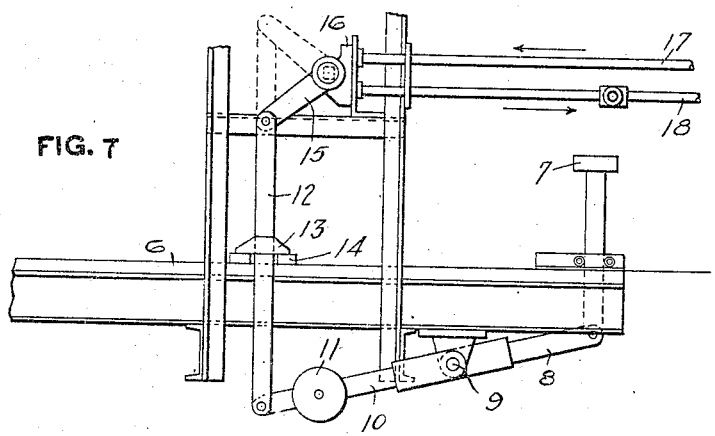

In the accompanying drawings, Figure 1 is a side view of a traveling bridge showing my invention applied thereto; Fig. 2 is an enlarged pier-end view of the bridge; Fig. 3 is a like view of the shear-end; Fig. 4 is an enlarged side view partly in section of the clamping mechanism; Fig. 5 is an end view partly in section; Fig. 6 is a plan view of the operator's platform showing the treadle for operating the valve controlling the cylinders which operate the weights. Fig. 7 is a side view of same, and Fig. 8 is a diagrammatic view showing the circuits and operating cables.

In the drawings, the numeral 2 designates a suitable traveling bridge provided at one end with what is commonly termed the pier-end 3 and at the other end the shear-end 4. The bridge may be provided with a clam-shell bucket or other device for lifting the material from one point and discharging it at another, but as this feature forms no part of my invention, it has not been deemed necessary to illustrate the same. The bridge is adapted to travel on the tracks 5.

A platform 6 is provided for the operator from which the movement of the bridge is controlled. The treadle 7 on said platform has the arms 8 which are connected to the rock-shaft 9. At the outer end of the rock-shaft 9 is the lever 10 carrying the weight 11, the outer end of said lever being connected to the rod 12. The collar 13 on said rod engages the stop 14 to control the movement of said rod. The upper end of the rod 12 is connected to the arm 15 of the three-way valve 16 which may be of any suitable type.

Connected up to the valve 16 are the pipes 17 and 18, the pipe 17 being the inlet and the pipe 18 being the outlet. The inlet pipe 17 leads from a suitable reservoir 19 containing the compressed air. The pipe 18 leads to the cylinder 20. The piston-rod 21 of the cylinder 20 carries the yoke 22 in which are mounted the sheaves 23 and 24. A cable 25 passes around the sheave 23 and over the sheave 26 and connected to said cable is the wedge-block 27.

A cable 28 passes around the sheave 24 and sheave 29, and thence down and around the sheaves 30 and 31. A wedge-block 32 is likewise connected to the cable 28 similar to the wedge-block 27.

The wedge-blocks 27 and 32 pass down into the frames 33 at each end of the pier-end of the bridge, and said blocks have the cross-heads 34 which engage the guide-rods 35 in said frames 33. The wedge-blocks are further provided with the vertical guide-grooves 36 to receive the rollers 37 at the upper ends of the clamping-levers 38. These clamping-levers are pivotally mounted in the casting 39 in the lower end of the pier-end by means of the pins 40. In the lower end of the clamping-arms 38 are the jaws 41 which are adapted to engage the rail-head 42.

Straps 43 engage the clamping-arms 38, said straps having the tie-bolts 44 to which the springs 45 are connected, said springs tending to normally hold the jaws of the clamping-arms in open position.

A motor 46 is carried by the pier-end. The motor-shaft is connected up to drive the shaft 47. At the outer ends of the shaft 47 are the bevel-gears 48 which mesh with the bevel-gears 49 on the shafts 50. Bevel-gears 50ª at ends of shafts 50 mesh with the bevel-gears 51 on the shafts 52, and at the lower end of said shafts are the bevel-gears 53 which mesh with the bevel-gears 54 on the shafts 55. The shafts 55 have the gear-wheels 56 which mesh with the large gears 57 in the shafts 58. The gear-wheels 59 on said shafts mesh with gear-wheels 60 mounted on the axles 61 of the trucks 62 on which the pier-end is mounted. In this manner power is applied to drive this end of the bridge.

A suitable switch 63 has the arm 64, one end of said arm carrying the weight 65 and the other carrying the weight 66, the weight 65 being heavier than the weight 66. A cable 67 connects the weight 65 with the cable 28 so that when the cable 28 is moved to lift the wedge-block, the movement of said cable will act to move the arm 63 of the switch and complete the circuit to the motor for moving the bridge along the tracks, as fully hereinafter set forth.

A branch-pipe 68 is connected to the pipe 18; said branch-pipe leads to the cylinder 69. Connected to the piston-rod 70 of the cylinder 69 are the sheaves 71, the cables 72 and 73 engaging the sheave 71. The cable 72 passes over and around the sheave 74 and to said cable is connected the wedge-block 75. The cable 73 passes over the sheave 76 and the wedge-block 77 is connected to said cable. The wedge-blocks 75 and 77 engage clamping-arms similar to those described in connection with the pier-end, but it is not deemed necessary to repeat the description in connection with the wedge-blocks 75 and 77.

The motors 78 are provided for moving the shear-end of the bridge, and said motors are connected up by suitable gearing with the wheels of the trucks supporting said shear-end. The switch 79, similar to the switch 63, is employed for controlling the current to the motors and the manner of operating this switch by the movement of the cable in raising the wedge-block is the same as that described in connection with the switch 63.

From the above description, it will be apparent that when the bridge is stationary the clamping-jaws will be in engagement with the rails to hold the bridge from movement, and as soon as it is desired to move the bridge, the operator by putting his foot upon the treadle 7 opposite the three-way valve to admit air to the cylinders 20 and 69, whereby through the connections described, the wedge-blocks are raised and the clamping-jaws freed from engagement with the rails, while at the same time as said wedge-blocks are lifted through the connection of the operating cables with the switches 63 and 79, the circuit to the controller 79ª is closed and the bridge may be moved along the tracks. When the bridge has reached the point desired, the controller is operated to stop the motors and the wedge-blocks of their own weight, move into position to bring the clamping-jaws into engagement with the rails, and at the same time the circuit between the motors and controller is broken. The exhaust from the cylinders passes out through the three-way valve through a restricted opening and this controls the descent of the wedge-blocks and prevents damage which might be caused by the too sudden drop of same.

In case an emergency stop is desired the release of the treadle will act to stop the motors through the operation of the switch even though the controller is on.

One of the advantages of this construction is that there is no danger of the operator throwing the motors into operation before the clamps have been released and thus causing damage.

What I claim is:

1. In a traveling bridge, the combination of a traversing motor, clamping-mechanism, means for operating said clamping-mechanism, and means automatically operable during the releasing operation of said clamping-mechanism for permitting the closing of the circuit to said motor.

2. In a traveling bridge, the combination of a motor, pivotally mounted clamping-arms, a wedge-block adapted to engage said arms, means for raising said wedge-blocks, and means operated by the movement of said wedge-blocks for permitting the closing of the circuit to said motor.

3. In a traveling bridge, the combination of a motor, pivotally mounted clamping-arms, a wedge-block adapted to engage said clamping-arms, a fluid-operated cylinder, flexible connections between said cylinder and said wedge-blocks, and means operated by the movement of said wedge-blocks for permitting the closing of the circuit to said motor.

4. In a traveling bridge, the combination of a motor, pivotally mounted clamping-arms, a wedge-block adapted to engage said clamping-arms, a fluid-operated cylinder, flexible connections between said cylinder and said wedge-block, a switch, and connections between said switch and said flexible connections, whereby said switch is operated by the movement of said connections.

5. In a traveling bridge, the combination of a motor, pivotally mounted clamping-arms, a suspended wedge-block adapted to engage said arms, means for raising said wedge-block, said wedge-block being lowered by its own weight, and means operated by the movement of said wedge-block for permitting the closing of the circuit to said motor.

6. In traveling bridges, the combination of a motor, pivotally mounted clamping-arms, a suspended wedge-block adapted to engage said arms, a fluid-operated cylinder, flexible connections between said cylinder and said wedge-block, a switch arm, unequal weights connected to the ends of said switch-arm, and a connection between the end of said arm carrying the heavier weight and said flexible connections, whereby the switch is operated to permit the closing of the circuit to said motor when said wedge-block is raised, and when said wedge-block descends by gravity, the heavier weight on said switch-lever will break the circuit to the motor.

7. In a traveling bridge, the combination of a traversing motor, clamping mechanism, means for operating said clamping mechanism, and automatic means controlled by the operation of the clamping mechanism to prevent the operation of said motor while said clamps are applied and to permit the operation of the motor while said clamps are released.

8. In a traveling bridge, the combination of a traversing motor, clamping mechanism, means for operating said clamping mechanism, and means operatively controlled by said clamping mechanism for closing a circuit to the motor during the releasing operation of said clamping mechanism.

9. In a rail clamp for traveling bridges, the combination of pivotally mounted clamping members, a wedge-block operable by gravity to actuate said members, and means for raising said wedge-blocks.

10. In a rail clamp for traveling bridges, the combination of clamping members, a wedge-block operable by gravity to actuate said clamping members, and means for raising said wedge-block.

11. In a rail clamp for traveling bridges, the combination of clamping members, a wedge-block operable by gravity to engage said members, means for raising said wedge-block, and means for controlling the speed of lowering of said wedge-block.

12. In a rail clamp for traveling bridges, the combination of clamping members, a wedge-block operable by gravity to actuate said members and fluid pressure means for raising said wedge-block.

13. In a rail clamp for traveling bridges, the combination of clamping members, a wedge-block operable by gravity to actuate said members, and fluid pressure means for raising said wedge-block, and means for controlling the speed of lowering said wedge-block.

In testimony whereof, I the said RAYMOND E. BROWN, have hereunto set my hand.

RAYMOND E. BROWN.

Witnesses:
JOHN F. WILL,
J. R. KELLER.